Patented Dec. 7, 1948

2,455,569

UNITED STATES PATENT OFFICE 2,455,569

REACTION PRODUCTS OF TERTIARY ORGANIC HYDROPEROXIDES WITH ALDEHYDES OR KETONES

Frank H. Dickey, Pasadena, Calif., assignor to Shell Development Company, San Francisco, Calif., a corporation of Delaware No Drawing. Application July 20, 1948, Serial No. 39,796

12 Claims. (Cl. 260—610)

This case is a continuation in part of application Serial No. 515,813 filed December 27, 1943, now abandoned.

This invention relates to a novel class of organic peroxides and to a process for the manufacture thereof. More particularly, the invention pertains to organic peroxides which may be formed by the interaction of a tertiary organic hydroperoxide with an organic compound containing a carbonyl radical. In one of its more specific embodiments the invention is directed to a novel class of organic peroxides of the general formula R—O—O—R₁, wherein R represents a substituted or unsubstituted aliphatic tertiary radical, i. e. one containing not less than four carbon atoms of aliphatic character, one of said carbon atoms being directly bound to the oxygen atom of the peroxy (—O—O—) radical as well as to three other carbon atoms, while R₁ is a nontertiary aliphatic radical, preferably saturated, in which the carbon atom directly attached to the other of the aforementioned peroxy oxygen atoms is also directly bound either to the hydroxyl radical or to a peroxyl radical —O—O—R₂ in which R₂ also represents a substituted or unsubstituted aliphatic tertiary radical. In one of its most specific embodiments, the invention covers those peroxides of the above class in which the symbols R₂ and R represent like saturated aliphatic tertiary radicals. The invention also includes the process of preparing these novel peroxides.

The present invention is predicated on the discovery that organic hydroperoxides in which the organic radical is directly attached to the peroxy radical via a carbon atom which is also directly bound to three other carbon atoms may be reacted with an organic compound containing a carbonyl radical, i. e. an aldehyde or a ketone, and that such an interaction results in the formation of the above-defined class of organic peroxides. More specifically stated, the invention resides in the preparation of novel peroxides by reacting a tertiary organic hydroperoxide of the general formula

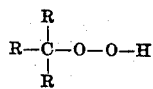

wherein each R represents a like or different organic radical, which may or may not be further substituted, with an organic compound containing a carbonyl group, this interaction of the tertiary organic hydroperoxide with the aldehydes or ketones being preferably effected at ordinary or sub-normal temperatures, and in the presence of an acid or acid-acting material, preferably a strong inorganic acid. This method of preparation, which is of broad and general application, results in the formation of the aforementioned and hereinbelow more fully described class of novel organic peroxide compounds in which one of the oxygen atoms of a peroxy radical is directly attached to a carbon atom which is in turn directly linked to three other carbon atoms, while the other oxygen atom of said peroxy radical is directly attached to a carbon atom which, in turn, is directly bound either to the hydroxy radical or to a peroxyl radical —O—O—R in which R represents a tertiary organic radical, preferably a saturated tertiary alkyl radical.

As mentioned above, any hydroperoxide in which the organic radical is attached to the hydroperoxy radical via a tertiary carbon atom may be used as one of the reagents or reactants in the manufacture of the novel class of peroxides in accordance with the process of the present invention. A particularly suitable group of such hydroperoxides includes or comprises tertiary alkyl hydroperoxides. The following are illustrative examples of such tertiary alkyl hydroperoxides which may be used as one of the reactants in the manufacture of the novel peroxides in accordance with the process of the present invention: tertiary butyl hydroperoxide, tertiary amyl hydroperoxide and their homologues and analogues such as the tertiary alkyl hydroperoxides formed by the substitution of the hydroperoxyl (—O—O—H) radical for the hydrogen atom on one or more of the tertiary carbon atoms of such saturated aliphatic hydrocarbons as 2-ethyl butane, 2-methyl pentane, 3-methyl pentane, 2,3-dimethyl butane, 2,4-dimethyl pentane, and their homologues. Also, suitable substitution products such as the tertiary alkyl hydroperoxides in which a halogen atom or atoms are attached to one or more of the carbon atoms (other than the one carrying the hydroperoxyl radical) may be reacted with the organic compound containing a carbonyl group in accordance with the process of the present invention to produce the organic peroxides of the class defined herein. Such halo-substituted tertiary alkyl hydroperoxides may, for example, be obtained by the controlled oxidation with oxygen in the presence of hydrogen bromide of halogenated saturated aliphatic hydrocarbons of the type of 1-chloro-2-methyl propane, 1-bromo-2-ethyl propane, 1-chloro-2-methyl butane, 1-bromo-3-methyl butane, 2-chloro-3-methyl butane, and the like. Still another group of hydroperoxides which may be thus employed in the process of the present invention includes compounds wherein one or more of the aliphatic radicals attached to the tertiary carbon atom (which is directly attached to the peroxy radical) are substituted by or contain attached thereto an aryl, alkaryl, aralkyl and/or alicyclic radical which may or may not be further substituted.

It was stated above that the process of the invention comprises the reaction of a tertiary organic hydroperoxide, particularly a saturated tertiary alkyl hydroperoxide, with an organic compound containing a carbonyl group. Although any such organic compound which contains a carbonyl group may be employed as the substance which is reacted with the above-mentioned hydroperoxide in accordance with the process of the present invention, the process is especially suitable when applied to the use of saturated aliphatic and alicyclic aldehydes and ketones. Preferably the aldehyde or ketone contains no polar group other than the carbonyl group. The following are illustrative examples of saturated aliphatic aldehydes and ketones which may be thus employed: acetaldehyde, propionaldehyde, butyraldehyde, isobutyraldehyde, methyl ethyl acetaldehyde, n-valeraldehyde, heptaldehyde, caprylic aldehyde, acetone, methyl ethyl ketone, methyl n-propyl ketone, methyl isopropyl ketone, diethyl ketone, methyl n-butyl ketone, ethyl n-propyl ketone, methyl isobutyl ketone, ethyl isopropyl ketone, methyl sec. butyl ketone, and the like and their homologues and suitable substitution products such as those in which various substituents are present in lieu of one or more of the hydrogen atoms of the above-defined aldehydes and/or ketones. For instance, hydroxy aldehydes, such as lactic aldehyde, hydracrylic aldehyde, acetaldol, and the like, as well as hydroxy ketones such as acetyl carbinol, propionyl carbinol, butyryl carbinol, acetoin, diacetone alcohol, acetopropyl alcohol, acetobutyl alcohol, hydracetal methyl ethyl ketone, and the like, may be reacted with hydroperoxides of the above class. Also, dicarbonyl compounds of the type of acetyl acetone, as well as the aldehyde acids and ketone acids, such as pyruvic acid, acetoacetic acid, levulinic acid, mesitonic acid, and the like may be employed. Still another sub-group of the carbonyl compounds includes the alicyclic ketones, e. g. cyclopentanone, cyclohexanone, as well as derivatives thereof in which one or more of the hydrogen atoms of the nucleus are substituted by alkyl, aryl, alkaryl, aralkyl and/or alicyclic radicals, which may or may not be further substituted. Also, included in the class of carbonyl compounds which may thus be reacted with the specified hydroperoxides are the aromatic compounds containing a carbonyl group, e. g. benzaldehyde, m - tolualdehyde, m - hydroxybenzaldehyde, o-methoxybenzaldehyde, salicylaldehyde, and phenylacetaldehyde.

The reaction between the hydroperoxides and the above-mentioned organic compunds containing a carbonyl group is effected in accordance with the process of the present invention in the presence of an acid or acid-acting catalyst, such as sulfuric acid, phosphoric acid, hydrochloric acid, hydrobromic acid, the sulfonic acids of benzene and its homologues, and the like. Generally, it is preferable to operate with inorganic acids of relatively high concentrations. For instance, highly satisfactory results have been obtained when the reaction was effected in the presence of concentrated hydrochloric acid. Nevertheless, in some cases, particularly when some of the more reactive ketones are to be condensed with the tertiary alkyl hydroperoxides, it is frequently desirable or even preferable to effect the reaction in the presence of relatively weaker or lower concentrations of these and like acid catalysts. For example, when resort is had to sulfuric acid, this acid may be employed in the form of 50% to 75% aqueous solutions thereof. The use of very low concentrations, i. e. weak acids, will as a rule decrease the rate of conversion and yields and thus may render the process uneconomical. On the other hand, the use of excessively high concentrations, i. e. very strong acids of the type of fuming sulfuric acid, should ordinarily be avoided because they will tend to react with the hydroperoxides to form undesirable by-products. Nevertheless, these acids may be employed provided care is taken to maintain suitable operating conditions; for instance, when relatively strong acids are employed it is preferred to lower the operating temperature and/or reaction time to prevent or inhibit the undesirable side reactions, while a decrease in the acid strength will generally necessitate a corresponding increase in the temperature to permit economical conversions to and yields of the desired novel peroxides.

The reaction between the hydroperoxide and the aldehyde or ketone in an acid or acid-acting medium may be effected in a batch, intermittent or continuous manner. Although this reaction may be executed within a relatively wide temperature range, satisfactory yields of the novel peroxidic compounds may be obtained by conducting the reaction in the liquid phase and at sub-normal or normal temperatures, e. g. in the range of from about −10° C. to about 35°. However, somewhat higher or lower temperatures may also be used. The optimum reaction temperature will depend at least in part on the specific reactants and catalyst employed and on the strength and amount of the acid or acid-acting material used. It was found that the reaction may be effectively realized by maintaining the reaction zone in an ice bath, i. e. at a temperature of about 0° C. The reaction is usually elastic in the sense that any desired proportion of the hydroperoxide, organic material containing a carbonyl group, and acidic reagent or catalyst may be employed. It has also been found that, at least in some cases, the desired reaction is favored by the presence of a dehydrating agent of the type of calcium chloride.

The reaction effected according to the process of the invention between organic compounds containing a carbonyl radical and hydroperoxides in which the organic radical is attached to the hydroperoxy radical via a tertiary carbon atom, results in the formation of novel compounds which may be generally represented as a class by the formula

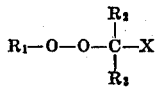

wherein $R_1$ represents an organic grouping containing not less than four carbon atoms, one of said carbon atoms being directly attached to the oxygen atom of the peroxy radical and to three other carbon atoms, $R_2$ is an organic radical, $R_3$ is either the hydrogen atom or a hydrocarbon radical, and X represents either the hydroxyl radical (—OH) or the radical —O—O—$R_4$ in which $R_4$ represents a tertiary organic grouping which, in one of the sub-classes of this class of novel compounds, is the same as the organic grouping represented by $R_1$.

A preferred group of these novel compounds results from reaction between one molecule of the organic compound containing a carbonyl radical and one molecule of the hydroperoxide in which the organic radical is attached to the hydroperoxy radical via a tertiary carbon atom. The group of compounds thus produced may be represented by the general formula

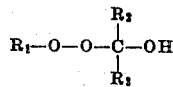

wherein $R_1$ represents a tertiary hydrocarbon radical, $R_2$ represents a hydrocarbon radical, while $R_3$ represents either the hydrogen atom or a hydrocarbon radical. A particular subgroup of this group comprises the peroxides represented by the last mentioned formula in which: $R_1$ is a substituted or unsubstituted saturated tertiary alkyl radical which is directly attached to the peroxy oxygen atom by means of a tertiary carbon atom of aliphatic character (the following being illustrative examples of such radicals: tertiary butyl, tertiary amyl, tertiary hexyl, tertiary heptyl, and their higher homologues, and suitable substitution products, e. g. wherein a halogen is substituted for one or more of the hydrogen atoms of said radicals), $R_3$ represents the hydrogen atom, while $R_2$ represents a saturated aliphatic hydrocarbon radical, a saturated alicyclic hydrocarbon radical, or a mononuclear aromatic hydrocarbon radical, which radical may or may not be further substituted as by the presence therein of the hydroxyl or carboxyl groupings. Preferably $R_2$ represents a saturated aliphatic hydrocarbon radical, such as a methyl, ethyl, n-propyl, isopropyl, n-butyl, isobutyl, n-pentyl, n-hexyl, etc. radical. Specific examples of compounds having structures defined by the foregoing structural formula are: alpha,alpha-dimethyl, alpha'-hydroxy diethyl peroxide; tertiary butyl peroxy, trichloromethyl, hydroxymethane; 1 - tertiary butyl peroxy, 1-hydroxypropane; 1-tertiary butyl peroxy, 1-hydroxyisobutane, and 1-tertiary butyl peroxy, 2-methyl-1-hydroxy pentane.

Another group of these novel compounds may be represented by the general formula

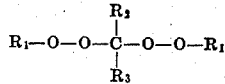

wherein each $R_1$ represents a like tertiary hydrocarbon radical and $R_2$ and $R_3$ each represents a like or different hydrocarbon radical, while $R_3$ may represent additionally the hydrogen atom. The compounds represented by this last formula appear to be formed by reaction between one molecule of the organic compound containing a carbonyl radical and two molecules of the hydroperoxide in which the organic radical is attached to the hydroperoxy radical via a tertiary carbon atom. It appears that the compounds represented by the formula next preceding the last-given formula, are formed as intermediate products which may react further with a molecule of the hydroperoxide reactant to form compounds represented by the last-given formula. A possible theory of the reaction between the organic carbonyl compound, i. e., the aldehyde or ketone, and the hydroperoxide reactant involves an equilibrium between the compounds of the two next preceding formulas that would be formed from the particular reactants employed. The position of the equilibrium, that is, which of the two possible products is formed in predominating amount or is obtained as the isolated product, depends upon the reactants that are used, and upon the particular conditions under which the reaction between the aldehyde or ketone and the hydroperoxide is carried out. In general, although not as an absolute rule, aliphatic ketones tend to react with hydroperoxides in which the organic radical is attached to the hydroperoxy radical via a tertiary carbon atom to form products resulting predominantly from reaction with two moles of the hydroperoxide. The presence of a dehydrating agent, such as calcium chloride, boric anhydride, or phosphorous pentoxide tends to favor the reaction of one molecule of the carbonyl compound with two molecules of the aforesaid hydroperoxide reactant.

A more particular subgroup of the compounds represented by the last-given formula comprises the peroxides having structures represented by the formula when each $R_1$ is a substituted or unsubstituted saturated tertiary alkyl radical which is directly attached to the peroxy oxygen atom via a tertiary carbon atom of aliphatic character, while $R_2$ and $R_3$ each represent a saturated aliphatic hydrocarbon radical, preferably a saturated primary or secondary aliphatic hydrocarbon radical, i. e. a methyl, ethyl, propyl, isopropyl, n-butyl, isobutyl, etc. radical. The above peroxides may have various substituents attached to the different carbon atoms. For instance, one or more of the hydrogen atoms may be substituted by one or more halogen atoms, hydroxyl or carboxyl groups and/or aryl, alkaryl, aralkyl and/or alicyclic radicals. A specific example of the above defined subgroup of novel compounds is ditertiary butyl isopropylidene peroxide which, as will be shown, is formed by reacting tertiary butyl hydroperoxide with acetone at a temperature of about 0° C. in the presence of concentrated hydrochloric acid. Another specific example is the ditertiary butyl sec.-butylidene peroxide formed by the condensation of tertiary butyl hydroperoxide with methyl ethyl ketone. Still further examples are: 2,2-ditertiary butyl peroxy, 4-methylpentane; and 3,3-ditertiary butyl peroxy, pentane, formed by the condensation of tertiary butyl hydroperoxide with diethyl ketone.

The following examples are illustrative of the process of the present invention and describe a method of preparing the novel peroxidic compounds. It is to be understood, however, that there is no intention of limiting the invention to any specific details presented in these examples or to the specific peroxidic compounds produced in these examples.

*Example I*

A mixture consisting of 32 cc. of tertiary butyl hydroperoxide, 100 cc. of actone, 10 g. of calcium chloride and 45 cc. of concentrated hydrochloric acid was allowed to stand for a period of about 20 minutes at a temperature of about 0° C. A fraction having a molecular weight (as determined by the cryoscopic method with benzene) of 220 g./mol was separated, as compared with a theoretical value of 220 for ditertiary butyl isopropylidene peroxide of the formula

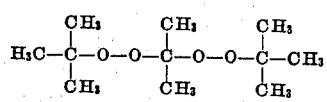

A determination of the active oxygen with potassium iodide 50% sulfuric acid solution gave an equivalent weight of 116 g./equivalent weight of active oxygen, as compared with the theoretical value of 110. The refractive index of this compound was $n_D^{20}=1.4093$.

Example II

The above run was repeated, using methyl ethyl ketone instead of the acetone. The reaction product thus formed was ditertiary butyl, sec.-butylidene peroxide which, upon analysis with potassium iodide 50% sulfuric acid solution, gave an equivalent weight of 116 g./equivalent of active oxygen, as compared with a theoretical value of 117. The refractive index was $n_D^{20}=1.4140$.

Example III 20 parts by volume of acetaldehyde, 5 parts by volume of tertiary butyl hydroperoxide, and 10 parts by volume of concentrated hydrochloric acid were mixed together with a small amount of calcium chloride and allowed to react at a temperature below 5° C. The water-insoluble layer was separated and found to have a refractive index $n_D^{20}=1.4110$ and an equivalent weight based on active oxygen of 130 as compared to the theoretical value of 134. These and other tests indicated that the product was alpha,alpha-dimethyl, alpha'-hydroxy diethyl peroxide.

Example IV

Substantially equivolumetric amounts of tertiary butyl hydroperoxide, diacetone alcohol and 65% aqueous sulfuric acid solution, were mixed and the reaction was conducted at a temperature of about 0° C. At the end of about one hour an insoluble liquid having a refractive index $n_D^{20}=1.4220$ was separated. Its equivalent weight based on active oxygen was 136. These and other tests identified the product as 2-methyl,2-hydroxy,4,4-ditertiary butyl peroxy, pentane, having the structural formula

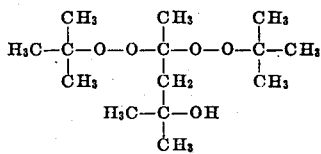

Example V

A crystalline compound was prepared by the interaction of levulinic acid and tertiary butyl hydroperoxide. For this purpose 10 parts by volume of the above acid were reacted with 20 parts by volume for a period of about 10 minutes in the presence of concentrated hydrochloric acid and a minor amount of calcium chloride. The resulting reaction mixture was then diluted with a large volume of water. The organic phase separated was washed and eventually crystallized to give a product having a melting point of about 43–45° C. Determination of the active oxygen with 50% sulfuric acid-potassium iodide solution gave an equivalent weight of 200 as compared to the theoretical equivalent weight of 206 for the compound 2-hydroxy-2-tertiary butyl peroxy valeric acid having the structural formula

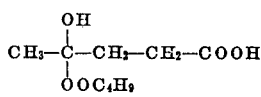

Example VI

Methyl isobutyl ketone, 0.8 gram-mole, was mixed at 0° C. and with stirring, with 0.172 gram-mole of tertiary butyl hydroperoxide and 10 grams of calcium chloride. After 10 minutes, 10 cubic centimeters of 37% hydrochloric acid solution was added at such a rate that the temperature of the mixture did not exceed 7° C.; about four minutes was required. After an additional six minutes the mixture was poured into ice-water; the organic layer was removed and washed with water to remove unreacted tertiary butyl hydroperoxide, and then with 50% aqueous alcohol to remove unreacted ketone. The product was obtained as a water-white mobile liquid having a molecular weight of 258 compared to a theoretical value of 262 for the compound 4-methyl, 2,2-ditertiary butyl peroxy, pentane. Refractive index of the produce was found to be 1.4196 ($n_D^{20}$). It contained 12.2% active oxygen, compared to the theoretical value of 12.2%.

Example VII

In the preceding example, conducted in the presence of calcium chloride, 20% of the tertiary butyl hydroperoxide reacted. Under identical conditions but using boric anhydride in place of the calcium chloride, the yield was increased to 36%.

Example VIII

Benzaldehyde and tertiary butyl hydroperoxide were reacted according to the method of Example VI. The separated product was identified as ditertiary butyl peroxy phenylmethane, of the formula

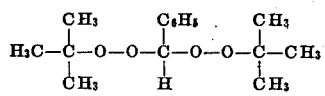

by analysis for carbon, hydrogen, and active oxygen, and determination of its molecular weight. The following are the results of the tests of the product: per cent carbon, 64.6 (theory 64.6); per cent hydrogen, 11.2 (theory, 10.8); per cent active oxygen, 11.6 (theory, 12.3); molecular weight, 259 (theory, 260).

Example IX

Chloral, 0.1 gram-mole, and tertiary butyl hydroperoxide, when reacted in hexane solution at 0° C. without addition of a dehydrating agent, formed tertiary butyl peroxy, trichloromethyl, hydroxymethane having after isolation the following properties:

|  | Found | Theory |
|---|---|---|
| Per cent Chlorine | 44.7 | 44.7 |
| Per cent Active oxygen | 6.7 | 6.7 |
| Molecular weight | 246 | 238 |

Example X

Additional products prepared by the procedure used in Example VI are as follows:

a. from diethyl ketone and tertiary butyl hydroperoxide:

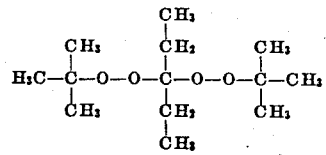

3,3-ditertiary butyl peroxy, pentane

|  | Found | Theory |
|---|---|---|
| Per cent Carbon | 62.4 | 62.9 |
| Per cent Hydrogen | 11.4 | 11.4 |
| Per cent Active oxygen | 12.6 | 12.9 |
| Molecular weight | 245 | 248 | b. from methyl n-propyl ketone and tertiary butyl hydroperoxide

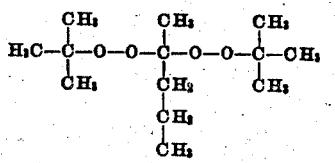

2,2-ditertiary butyl peroxy, pentane

|  | Found | Theory |
|---|---|---|
| Per cent Carbon | 62.6 | 62.9 |
| Per cent Hydrogen | 11.4 | 11.4 |
| Per cent Active oxygen | 13.2 | 12.9 | c. from cyclohexanone and tertiary butyl hydroperoxide

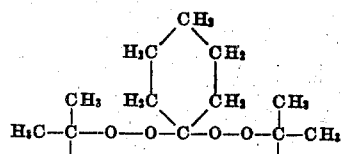

1,1-ditertiary butyl peroxy, cyclohexane

|  | Found | Theory |
|---|---|---|
| Per cent Carbon | 64.6 | 64.6 |
| Per cent Hydrogen | 11.2 | 10.8 |
| Per cent Active oxygen | 11.6 | 12.3 |
| Molecular weight | 259 | 260 |

The properties possessed by the novel peroxidic compounds adapt them admirably for use in various organic reactions as well as for other purposes. For instance, some of these novel compounds may be used as additives to improve the cetane value of Diesel engine fuels. Also, these peroxidic compounds may be employed individually or in admixtures with one another or with other substances, as catalysts for various chemical reactions. For example, they may be used for the polymerization of polymerizable unsaturated compounds including both the conjugated and the non-conjugated unsaturated polymerizable compounds.

Although unsaturated organic compounds having a single polymerizable olefinic linkage, e. g. styrene, alpha-methyl styrene, many vinyl and allyl derivatives, and the nitriles and many esters of acrylic and alpha-substituted acrylic acids, all of which fall within the class of unconjugated unsaturated polymerizable organic compounds, may be effectively polymerized in the presence of the above defined class of novel catalysts to produce resins and resin-like substances, nevertheless of growing importance for resins is another group of unconjugated unsaturated compounds having two or more polymerizabl non-conjugated double bonds between carbon atoms of aliphatic character. Examples of these are the unsaturated aliphatic polyesters of saturated polybasic acids, the unsaturated aliphatic polyethers of saturated polyhydric alcohols, and the unsaturated aliphatic esters of unsaturated aliphatic acids. Also included in this class are the polymerizable unsaturated compounds containing in the molecule one or more polymerizable organic radicals and one or more inorganic radicals or elements. Examples of such compounds are the vinyl, allyl and methallyl esters of phosphoric acid and of the ortho acids of silicon, boron, etc.

Another important group of compounds which may be polymerized by the novel peroxidic compounds of the present invention consists of polymerizable compounds having two or more and preferably two conjugated unsaturated carbon-to-carbon linkages. These compounds are substantially hydrocarbon in character, although they may contain substituents such as halogen, nitro, sulfo, etc. By far the most important subgroup of such compounds comprises the hydrocarbons and substituted hydrocarbons having in the molecule two double bonds in conjugated relationship to one another, these double bonds being between carbon atoms of aliphatic character. Representative examples of such compounds are butadiene-1,3, 2-chlorbutadiene-1,3, isoprene, and the higher homologues thereof. In general, the polymerization of conjugated diene hydrocarbons and substituted hydrocarbons in accordance with the invention results in products which are synthetic elastomers in character and as a consequence belong to the general group of substances known as synthetic rubbers.

The novel compounds of the invention are applicable to the polymerization of single compounds of the above-outlined groups and to the co-polymerization of two or more compounds; for instance in the production of compounds which are synthetic elastomers in character, one or more of the conjugated diene hydrocarbons may be polymerized in accordance with the process described herein and in the presence of the novel peroxide catalysts with one or more of the polymerizable unsaturated compounds of the type of styrene, acrylonitrile, isobutylene, vinyl chloride, methyl methacrylate, and the like. Synthetic resins usually require the addition of one or more plasticizers, stabilizers, lubricants, dyes, pigments, fillers, or other modifiers. Where these modifiers do not chemically react with or otherwise adversely affect the ingredients of the reaction mixture, they may be added to the monomer or other partially polymerized material during the polymerization reaction.

The novel peroxides of the present invention may be used as the polymerization catalyst either alone or in combination with one another or with other catalysts such as benzoyl peroxide, lauroyl peroxide, acetyl peroxide, benzoyl acetyl peroxide, and hydrogen peroxide. The catalysts of the invention are ordinarily dissolved in the polymerizable compounds prior to polymerization. Amounts of catalyst as small as a fraction of a per cent based on the weight of the monomer are catalytically effective. Larger percentages have correspondingly greater effect. Too much catalyst is generally to be avoided as likely to render the reaction violent or as adversely affecting the properties of the polymer, particularly as to molecular weight and the ramifications thereof. The amount of catalyst ordinarily varies from about 0.01% to about 5% or more by weight of the monomer.

The polymerization may be carried out in a continuous or discontinuous manner, under atmospheric, superatmospheric or reduced pressures. The polymerization will usually be energized by the application of heat, although both heat and light may be used, and in some cases light alone is sufficient. The invention may be applied to monomeric compounds in the massive state or to dispersions or solutions of the monomer or monomers. Where the dispersion method is employed it is normally desirable to select a dispersing medium insoluble in the catalyst involved. In general, the temperatures customary for similar polymerization reactions under the influence of other catalysts, e. g. benzoyl peroxide, may be used. Depending upon the particular material and the conditions involved, temperatures of from about room temperature to above 200° C. may be used. This usually, although not necessarily, involves the use of superatmospheric pressures.

I claim as my invention:

1. Ditertiary butyl isopropylidene peroxide having the structural formula

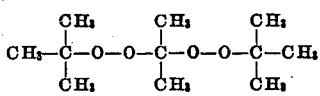

2. Ditertiary butyl sec.-butylidene peroxide having the structural formula

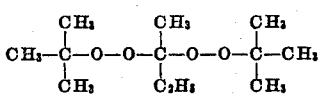

3. Alpha,alpha-dimethyl,alpha' - hydroxy diethyl peroxide having the structural formula

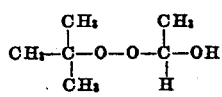

4. Ditertiary alkyl sec.-alkylidene peroxide.

5. A peroxide of the general formula

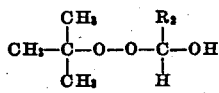

wherein $R_2$ is a radical chosen from the group consisting of the saturated aliphatic hydrocarbon radicals, the saturated alicyclic hydrocarbon radicals, and the mononuclear aromatic hydrocarbon radicals.

6. A peroxide compound of the general formula

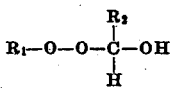

wherein $R_1$ is a tertiary alkyl radical linked to the peroxy radical by a bond of a tertiary carbon atom, and $R_2$ is a radical chosen from the group consisting of the saturated aliphatic hydrocarbon radicals, the saturated alicyclic hydrocarbon radicals, and the mononuclear aromatic hydrocarbon radicals.

7. A peroxide compound of the general formula

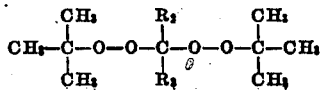

wherein $R_2$ and $R_3$ are saturated aliphatic hydrocarbon radicals.

8. A peroxide compound of the general formula

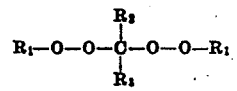

wherein $R_1$ is a tertiary alkyl radical linked to the peroxy radical by a bond of a tertiary carbon atom, and $R_2$ is a radical chosen from the group consisting of the saturated aliphatic hydrocarbon radicals, the saturated cycloaliphatic hydrocarbon radicals and the mononuclear aromatic hydrocarbon radicals, and $R_3$ is chosen from the group consisting of the saturated aliphatic hydrocarbon radicals and the hydrogen atom.

9. A process for the production of peroxide compounds comprising reacting an alkyl hydroperoxide having a tertiary carbon atom directly linked to the peroxy radical with a saturated aliphatic compound chosen from the group consisting of unsubstituted aldehydes, unsubstituted ketones, hydroxy aldehydes, hydroxy ketones, aldehydes carboxylic acids, ketone carboxylic acids and diketones, in the presence of a strong inorganic acid at a temperature in the range of from −10° C. to 35° C.

10. A process for the production of peroxide compounds comprising reacting an alkyl hydroperoxide having a tertiary carbon atom directly linked to the peroxy radical with a saturated aliphatic carbonyl compound which contains no polar group other than the carbonyl group, in the presence of a strong mineral acid at a temperature in the range of from −10° C. to 35° C.

11. A process for the production of peroxide compounds which comprises reacting a tertiary alkyl hydroperoxide with a saturated aliphatic ketone, said ketone containing no polar group other than the carbonyl group, in the presence of a strong inorganic acid at a temperature in the range of from −10° C. to 35° C.

12. A process for the production of peroxide compounds which comprises reacting a tertiary alkyl hydroperoxide with a saturated aliphatic aldehyde, said aldehyde containing no polar group other than the carbonyl group, in the presence of a strong inorganic acid at a temperature in the range of from −10° C. to 35° C.

FRANK H. DICKEY.

No references cited.